US006655208B1

(12) United States Patent
McClanahan

(10) Patent No.: US 6,655,208 B1
(45) Date of Patent: Dec. 2, 2003

(54) METHOD AND APPARATUS FOR BALANCING A VEHICULAR DRIVESHAFT

(75) Inventor: Virginia L. McClanahan, Monclova, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 340 days.

(21) Appl. No.: 09/651,502

(22) Filed: Aug. 30, 2000

Related U.S. Application Data

(60) Provisional application No. 60/151,784, filed on Aug. 31, 1999.

(51) Int. Cl.[7] .............................................. G01N 23/00
(52) U.S. Cl. .............................. 73/462; 73/460; 73/464
(58) Field of Search ........................ 73/462, 455, 470, 73/460, 573, 458, 464; 460/180, 162

(56) References Cited

U.S. PATENT DOCUMENTS

| 3,812,724 | A | * | 5/1974 | Curtz et al. ..................... 73/458 |
| 3,830,109 | A | * | 8/1974 | Litvinovich et al. ........... 73/455 |
| 4,037,076 | A | * | 7/1977 | Blackaby ................. 219/121 L |
| 4,109,532 | A | * | 8/1978 | Donato ......................... 73/457 |
| 4,109,549 | A | * | 8/1978 | Vincent ......................... 73/455 |
| 4,454,763 | A | * | 6/1984 | Mahler ......................... 73/639 |
| 4,530,239 | A | * | 7/1985 | Scarinci ........................ 73/455 |
| 4,561,306 | A | * | 12/1985 | Marino et al. .............. 73/866.5 |
| 5,234,378 | A | | 8/1993 | Helgesen et al. ............ 464/180 |
| 5,398,550 | A | * | 3/1995 | Bauer ........................... 73/480 |
| 5,628,688 | A | | 5/1997 | Eversole ..................... 464/162 |
| 5,634,853 | A | | 6/1997 | Smith .......................... 464/162 |
| 5,638,174 | A | * | 6/1997 | Henderson ................... 356/343 |
| 5,907,106 | A | * | 5/1999 | Segar ....................... 73/862.338 |
| 5,979,236 | A | * | 11/1999 | Hong et al. .................... 73/458 |
| 6,189,371 | B1 | * | 2/2001 | Hirano ........................... 73/66 |
| 6,282,950 | B1 | * | 9/2001 | Taylor, Jr. et al. ........ 73/150 A |

* cited by examiner

*Primary Examiner*—Hezron Williams
*Assistant Examiner*—Jacques Saint-Surin
(74) *Attorney, Agent, or Firm*—MacMillan, Sobanski & Todd, LLC

(57) ABSTRACT

A method and apparatus for quickly and efficiently balancing an article, such as a tube for use in a vehicular drive shaft assembly, for rotation about an axis is provided. Initially, a balance ring is press fit or otherwise mounted onto the article to be balanced. The balance ring includes a ring of a material that can be selectively removed to balance the article for rotation, such as powdered metal. The article is mounted on an apparatus for rotating the article at a predetermined speed and for sensing vibrations that are caused by imbalances in the structure of the article. An electronic controller is responsive to such sensed vibrations for determining the size and location of one or more balance weights that, if secured to the article, will minimize or eliminate these imbalances. The electronic controller actuates a source of energy, such as a laser, to alter the physical properties (such as by hardening, for example) of only those portions of the ring that correspond with the size and location of the balance weights that will minimize or eliminate the imbalances therein. Thereafter, the unhardened portions of She ring are removed, leaving only the hardened portions thereof as the balance weights.

14 Claims, 3 Drawing Sheets

METHOD AND APPARATUS FOR BALANCING A VEHICULAR DRIVESHAFT

CROSS REFERENCE TO RELATED APPLICATION

This application claims the benefit of U.S. Provisional Application No. 60/151,784, filed Aug. 31, 1999, the disclosure of which is incorporated herein by reference.

BACKGROUND OF THE INVENTION

This invention relates in general to a method and apparatus for balancing an article, such a vehicular driveshaft tube or driveshaft assembly, for rotation about an axis. More specifically, this invention relates an improved method and apparatus for automatically balancing such an article by initially mounting an annular balance ring thereon, securing certain portions of the balance ring to the article, and removing the remaining portions thereof so as to automatically balance the article.

In most land vehicles, a source of rotational energy, such as an internal combustion or diesel engine, is connected by means of a driveshaft assembly to rotate one or more driven wheels. The driveshaft assembly typically extends between an output shaft of a transmission, which is connected to and rotatably driven by the engine, and an input shaft of an axle assembly, or transfer case which is connected to rotatably drive the driven wheels. In some vehicles, the distance separating the transmission and the axle assembly is relatively short. In these vehicles, the driveshaft assembly can be formed from a single driveshaft tube having first and second universal joints that connect the ends of the driveshaft tube to the output shaft of the transmission and the input shaft of the axle assembly. In other vehicles, the distance separating the transmission and the axle assembly is relatively long, making the use of a single driveshaft tube impractical. In these vehicles, the driveshaft assembly can be formed from a plurality of separate driveshaft tubes. The driveshaft tubes are connected together by a first universal joint, and second and third universal joints are provided to connect the ends of the driveshaft tubes to the output shaft of the transmission and the input shaft of the axle assembly.

Ideally, each of the driveshaft tubes would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tubes usually contain variations in roundness, straightness, and wall thickness that result in minor imbalances when rotated at high speeds. To prevent such imbalances from generating undesirable noise or vibration when rotated during use, therefore, it is commonplace to counteract such imbalances by securing balance weights to selected portions of the driveshaft tube. The balance weights are sized and positioned to counterbalance the imbalances of the driveshaft tube such that it is balanced for rotation during use.

Traditionally, the balancing process has been performed through the use of a conventional balancing machine. The balancing machine includes a pair of fittings that are adapted to support the ends of the driveshaft assembly thereon. The balancing machine further includes a motor for rotating the driveshaft assembly at a predetermined speed. As the driveshaft assembly is rotated, the balancing machine senses vibrations that are caused by imbalances in the structure of the driveshaft assembly. The balancing machine is responsive to such vibrations for determining the size and location of one or more balance weights that, if secured to the driveshaft, will minimize these imbalances. The rotation of the driveshaft assembly is then stopped to allow such balance weights to be secured to the outer surface of the driveshaft assembly in a conventional manner, such as by welding, adhesives, and the like. The driveshaft assembly is again rotated to confirm whether proper balance has been achieved or to determine if additional balance weights are required. A number of such balancing machines of this general structure and method of operation are known in the art.

Although such prior art balancing machines have been effective, this balancing process has been found to be relatively slow and inefficient. This is because each driveshaft tube must usually be rotated and measured at least two times, a first time to measure the imbalances and determine the size and location of the balance weights, and a second time to confirm that proper balance has been achieved after the balance weights have been secured thereto. This time consuming process is particularly problematic in the context of balancing vehicular driveshaft tube, which are typically manufactured in relatively large volumes. Thus, it would be desirable to provide an improved method and apparatus for quickly and efficiently balancing an article, such a tube for use in a vehicular driveshaft assembly, for rotation about an axis.

SUMMARY OF THE INVENTION

This invention relates to an improved method and apparatus for quickly and balancing an article, such as a tube for use in a vehicular driveshaft assembly, for rotation about an axis. Initially, a balance ring is press fit or otherwise mounted onto the article to be balance . The balance ring includes a ring of a material that can be selectively removed to balance the article for rotation, such as powdered metal. The article is mounted on an apparatus for rotating the article at a predetermined speed and for sensing vibrations that are caused by imbalances in the structure of the article. An electronic controller is responsive to such sensed vibrations for determining the size and location of one or more balance weights that, if secured to the article, will minimize or eliminate these imbalances. The electronic controller actuates a source of energy to alter the physical properties (such as by hardening, for example) of only those portions of the ring that correspond with the size and location of the balance weights that will minimize or eliminate the imbalances therein. Thereafter, the unhardened portions of the ring are removed, leaving only the hardened portions thereof as the balance weights.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
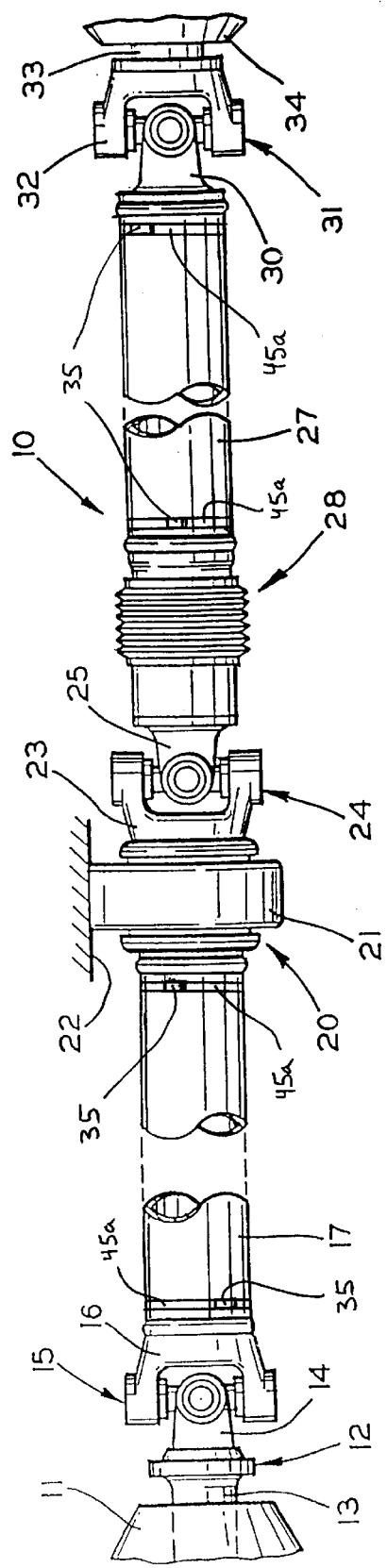
FIG. 1 is a side elevational view of a portion of a vehicle drive train system including a driveshaft assembly composed of a pair of unbalanced driveshaft sections, wherein each of the driveshaft sections has a plurality of balance weights mounted thereon for rotationally balancing the driveshaft assembly in accordance with this invention.

Referring now to the drawings, there is illustrated in FIG. 1 a portion of a drive train system, indicated generally at 10, for a vehicle that is adapted to transmit rotational power from an engine/transmission assembly 11 to a plurality of driven wheels (not shown). The engine/transmission assembly 11 is conventional in the art and includes an externally splined output shaft (not shown) that is connected to a first slip yoke assembly, indicated generally at 12. The first slip yoke assembly 12 is conventional in the art and includes an internally splined tubular end portion 13 that slidably engages the externally splined output shaft of the engine/transmission assembly 11. As a result, the tubular end portion 13 of the first slip yoke assembly 12 is rotatably driven by the output shaft of the engine/transmission assembly 11, but is free to move axially relative thereto to a limited extent. The first slip yoke assembly 12 further includes a yoke 14 that forms one part of a first universal joint assembly, indicated generally at 15. The first universal joint assembly 15 is also conventional in the art and includes a tube yoke 16 that is connected to the yoke 14 by a cross in a known manner. The tube yoke 16 is secured, such as by bonding or welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of angular misalignment therebetween. Alternatively, the output shaft of the engine/transmission assembly 11 may terminate in a conventional end yoke (not shown) that is directly connected to the cross of the first universal joint assembly 15.

The first driveshaft section 17 extends through and is supported for rotation by a center bearing assembly, indicated generally at 20. The center bearing assembly 20 is conventional in the art and includes a rigid frame or bracket 21 that is secured to a portion of a frame, chassis, or body 22 of the vehicle. The center bearing assembly 20 further includes an annular bearing (not shown) for rotatably supporting the first driveshaft section 17 therein. The first driveshaft section 17 terminates in a second end including an end yoke 23, which forms one part of a second universal joint assembly, indicated generally at 24. The second universal joint assembly 24 is also conventional in the art and includes a yoke shaft 25 that is connected to the end yoke 23 by a cross in a known manner. The yoke shaft 25 is, in turn, connected through a second slip yoke assembly, indicated generally at 28, to a first end of a second driveshaft section 27. The second universal joint assembly 24 thus provides a rotational driving connection between the first driveshaft section 17 and the second driveshaft section 27, while permitting a limited amount of axial misalignment therebetween. The structure and operation of the second slip yoke assembly 28 is conventional in the art and forms no part of this invention.

The second driveshaft section 27 terminates in a second end having a tube yoke 30 secured thereto. The tube yoke 30 forms one part of a third universal joint assembly 31. The third universal joint assembly 31 is also conventional in the art and includes a tube yoke 32 that is connected to an input shaft 33 of an axle assembly 34 by a cross in a conventional manner. The third universal joint assembly 31 thus provides a rotational driving connection between the second driveshaft section 27 and the input shaft 33 of the angular assembly 34, while permitting a limited amount of axial misalignment therebetween. The axle assembly 34 is conventional in the art and is adapted to transmit rotational power from the input shaft 33 to the driven wheels of the vehicle in a known manner. The structure of the drive train system 10 thus far described is conventional in the art and is intended to be representative of any structure for transmitting rotational power from a source to a load.

As is well known in the art, most driveshaft tubes, such as the driveshaft sections 17 and 27, usually contain variations in roundness, straightness, and wall thickness that result in minor imbalances when rotated at high speeds. To prevent such imbalances from generating undesirable noise or vibration, therefore, it is commonplace to counteract such imbalances by securing balance weights to selected portions of the driveshaft tube. To accomplish this, a plurality of balance weights 35 are secured to the outer surface of the driveshaft sections 17 and 27. The manner in which such balance weights 35 are secured to the driveshaft sections 17 and 27 will be described in detail below. In the illustrated embodiment, balance weights 35 are secured to both ends of both of the driveshaft sections 17 and 27. However, it will be appreciated that the illustrated balance weights 35 are intended to be provided in whatever number and at whatever locations are necessary to balance the driveshaft sections 17 and 27 for rotation. Thus, a greater or lesser number of such balance weights 35 may be provided at different locations than as specifically illustrated.

Figure 2:
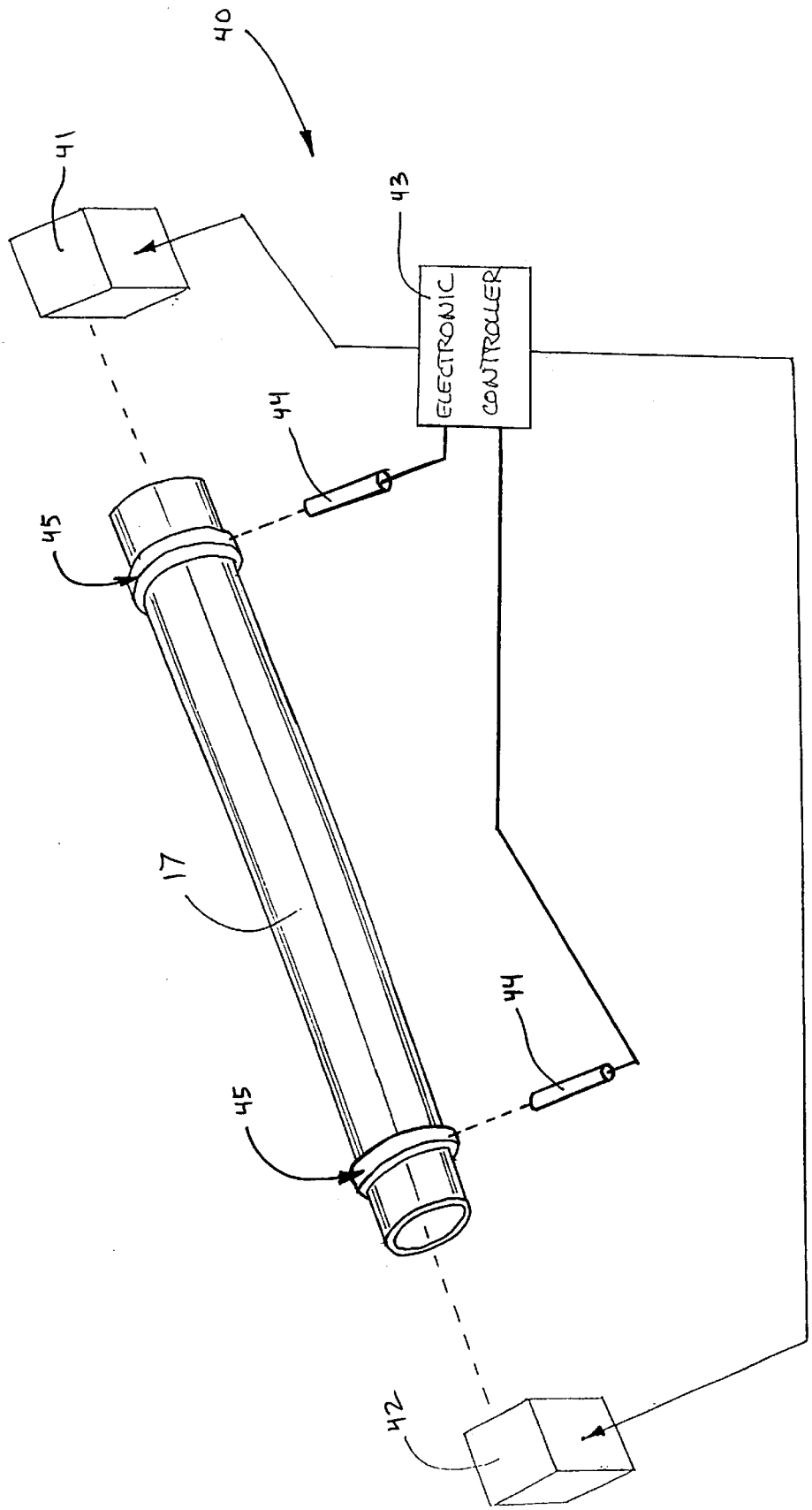
FIG. 2 is a perspective view of an apparatus for rotationally balancing one of the driveshaft sections illustrated in FIG. 1 in accordance with this invention.

FIG. 2 is a perspective view of an apparatus, indicated generally at 40, for rotationally balancing the driveshaft section 17 illustrated in FIG. 1 in accordance with this invention. The apparatus 40 includes a pair of supports 41 and 42 that are adapted to engage and support the ends of the driveshaft section 17. In the illustrated embodiment, the supports 41 and 42 are adapted to directly engage and support the end portions of the driveshaft section 17. However, it is contemplated that the supports 41 and 42 may alternatively engage the yokes 16 and 23 secured to the ends of the driveshaft section 17 or, for that matter, any other portion of the driveshaft section 17. As will be explained further below, the supports 41 and 42 are adapted to effect selective rotational movement of the driveshaft section 17.

The apparatus 40 also includes an electronic controller 43 that is connected to selectively operate the supports 41 and 42. The electronic controller 43 is conventional in the art and may be embodied as any known microprocessor or programmable controller. In a manner that is well known in the art, when the driveshaft section 17 is mounted on the supports 41 and 42, the electronic controller 43 causes the supports 41 and 42 to rotate the driveshaft section 17 at a predetermined speed. As the driveshaft section 17 is rotated, one or more conventional sensors (not shown) sense vibrations that are caused by imbalances in the structure of the driveshaft section 17. The electronic controller 43 is responsive to such sensed vibrations for determining the size and location of one or more balance weights that, if secured to the driveshaft section 17, will minimize or eliminate these imbalances.

The apparatus 40 further includes one or more sources of energy 44 that can be directed against portions of the driveshaft section 17. The structure and operation of the source of energy 44 will be described in greater detail below. However, the source of energy 44 may be embodied as any conventional device for directing a beam of radiant energy against portions of the driveshaft section 17, such as a laser. The electronic controller 43 is connected to the source of energy 44 to control the operation thereof as described below.

Prior to beginning such rotation, however, one or more balance rings, indicated generally at 45, are initially disposed on the driveshaft section 17. In the illustrated embodiment, two of such balance rings 45 are provided adjacent to the opposed ends of the driveshaft section 17. However, it will be appreciated that a greater or lesser number of such balance rings 45 may be provided at any desired location on the driveshaft section 17. Preferably, the balance rings 45 are press fit onto the ends of the driveshaft section 17, although such is not necessary. For example, the balance rings 45 may be secured to the driveshaft section 17 in any other conventional manner, such as by adhesives, welding, and the like.

Figure 3:
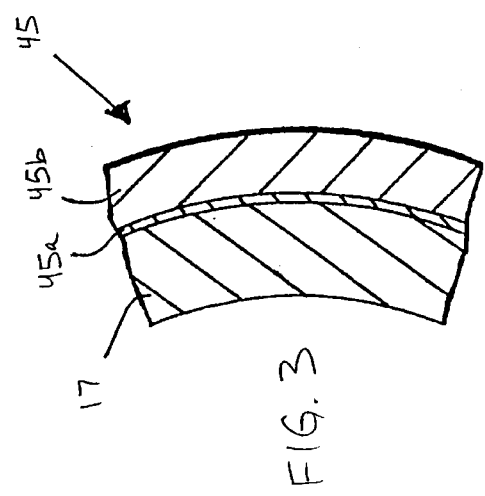
FIG. 3 is an enlarged sectional elevational view of a portion of the driveshaft section and one of the balance rings illustrated in FIG. 2.

The structure of a portion of one of the balance rings 45 is illustrated in FIG. 3. As shown therein, the illustrated balance ring 45 includes an inner ring 45a and an outer ring 45b. However, it will be appreciated that the balance ring 45 may be formed from a single ring of material and may have any desired shape. The inner ring 45a is preferably formed from a rigid material that is similar to the material used to form the driveshaft section 17, such as steel, aluminum, and the like. The inner diameter of the inner ring 45a is preferably approximately the same as the outer diameter of the driveshaft section 17 so as to allow the inner ring 45a to be press fit onto the driveshaft section 17, as described above. If desired, a portion (not shown) of the inner ring 45a may be slightly enlarged to facilitate the installation of the balance ring 45 on the driveshaft section 17. The outer ring 45b is preferably bonded or otherwise secured to the inner ring 45a in any conventional manner. The outer ring 45b is preferably formed from a material that, can be selectively removed to balance the driveshaft section 17 for rotation. For example, the outer ring 45b may be formed from any conventional powdered material that has been pressed or otherwise formed into a rigid hollow cylindrical preform. Preferably, the powdered material is composed of particles of one or more metals that can be sintered by the application of heat or other radiation, such as steel, iron, copper, cobalt, nickel, and alloys thereof. Because powdered metal material of this general type is initially in an non-sintered condition, the preform that forms the outer ring 45b may be somewhat brittle. The base ring 45a functions as a base for supporting the brittle outer ring 45b until it has been hardened in the manner described below.

Figure 4:
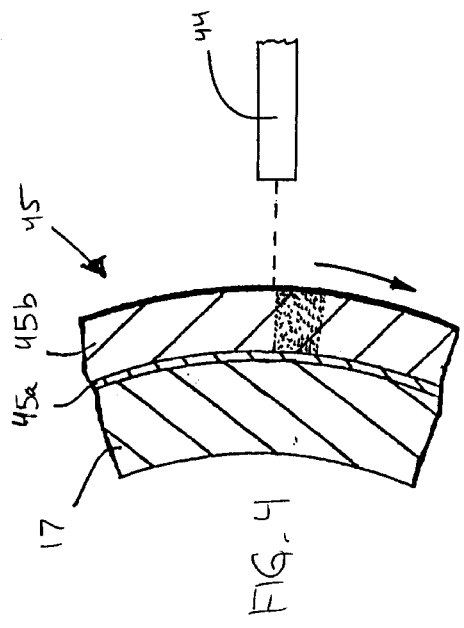
FIG. 4 is an enlarged sectional elevational view similar to FIG. 3 showing the balance ring in an initial condition of being hardened.
Figure 6:
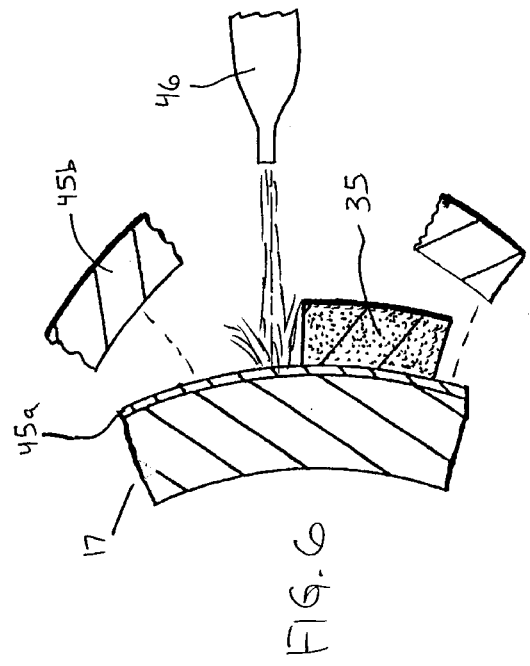
FIG. 6 is an enlarged sectional elevational view similar to FIG. 5 showing the unhardened portions of the balance ring being removed.
Figure 5:
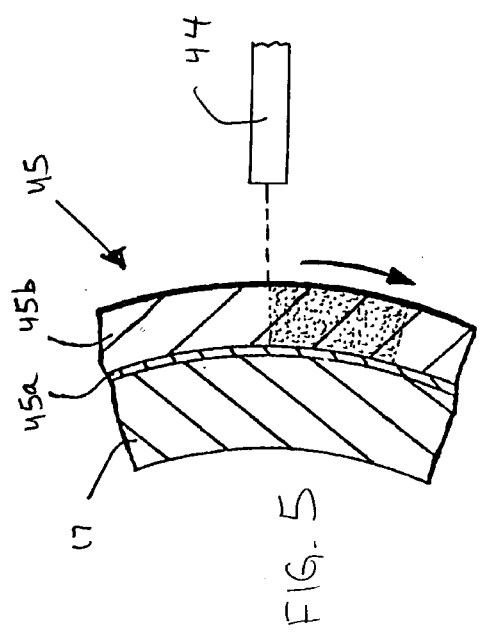
FIG. 5 is an enlarged sectional elevational view similar to FIG. 4 showing the balance ring in a subsequent condition of being hardened.

The source of energy 44 described above is used to selectively alter the physical properties of the outer ring 45b. To accomplish this, the driveshaft section 17 can be rotated relative to the source of energy 44, as shown in FIG. 4. Then, the source of energy 44 is actuated by the electronic controller 43 to direct radiant energy against portions of the outer ring 45b of the balancing ring 45. As shown in FIGS. 5 and 6, the impingement of the radiant energy from the source of energy 44 against the outer ring 45b causes those portions of the outer ring 45b to be altered. If the outer ring 45b is formed from a non-sintered preform of powdered metal material, then the radiant energy form the source of radiant energy can cause those portions of the outer ring 45b to become sintered. As is well known, this sintering causes the portions of the outer ring 45b (indicated by the darkened areas in FIGS. 4 and 5) to harden and become a coherent mass. The remaining portions of the outer ring 45b remain in their original relatively brittle condition.

As mentioned above, the electronic controller 43 is responsive to sensed vibrations induced in the driveshaft section 17 during rotation for determining the size and location of one or more balance weights that, if secured to the driveshaft section 17, will minimize or eliminate these imbalances. In response to this determination, the electronic controller actuates the source of energy 44 to harden only those portions of the outer ring 45b of the balance ring 45 that correspond with the size and location of the balance weights that will minimize or eliminate the imbalances therein. This is preferably accomplished while the driveshaft section 17 is continued to be rotated on the balancing apparatus 40. As a result, the portions of the outer ring 45b that are hardened by the source of energy 44 correspond in size and location to the size and location of the balance weights that will minimize or eliminate the rotational imbalances in the driveshaft section 17. The electronic controller 43 may be programmed to accomplish these tasks using any conventional algorithm, which is considered to be within the scope of a person having ordinary skill that art.

Thereafter, the unhardened portions of the outer ring 45b of the balancing ring 45 are removed, leaving only the hardened portions thereof as the balance weights 35. The removal of the unhardened portions of the outer ring 45b can be accomplished in any desired manner. For example, as shown in FIG. 6, the apparatus 40 can be provided with a device 46 that directs a high intensity or velocity flow of a fluid, such as air or water, against the outer surface of the outer ring 45b, causing the unhardened portions thereof to be broken away. Thus, the remaining hardened portions of the outer ring 45b are retained on the inner ring 45a and the driveshaft section 17 to balance the driveshaft section 17 for rotation. The operation of the device 46 can also be controlled by the electronic controller 43.

Although this invention has been described and illustrated in the context of a vehicular drive train assembly 10 having multiple driveshaft sections 17 and 27, it will be appreciated that this invention may be practiced in a vehicular drive train assembly having only a single driveshaft tube. It will be further appreciated that this invention is not limited to vehicular driveshaft tube applications, but rather may be practiced in connection with any type of structure that is rotated during use.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for balancing an article for rotation comprising the steps of:
   (a) providing a balance ring on the article;
   (b) rotating the article and the balance ring to determine any unbalance therein;
   (c) altering the physical properties of a first portion of the balance ring, and not altering the physical properties of a second portion of the balance ring; and
   (d) removing the second portion of the balance ring to balance the article and the remaining portion of the balance ring for rotation.

2. The method defined in claim 1 wherein said step (a) is performed by press fitting the balance ring on the article.

3. The method defined in claim 1 wherein said step (a) is performed by providing a balance ring including an inner ring and an outer ring.

4. The method defined in claim 3 wherein said step (a) is performed by forming the inner ring from a rigid material that is similar to the material used to form the article.

5. The method defined in claim 4 wherein said step (d) is performed by removing a portion of the outer ring of the balance ring to balance the article and the balance ring for rotation.

6. The method defined in claim 3 wherein said step (a) is performed by forming the outer ring from a material that can be selectively removed to balance the article for rotation.

7. The method defined in claim 1 wherein said step (a) is performed by providing a preform of a powdered metal material.

8. The method defined in claim 1 wherein said step (a) is performed by providing a preform of a powdered metal material, and wherein said step (c) is performed by sintering a portion of the preform, and wherein said step (d) is performed by removing the non-sintered portion of the preform to balance the article and the remaining portion of the preform for rotation.

9. The method defined in claim 1 wherein said step (d) is performed by directing a high intensity or velocity flow of a fluid against the ring.

10. The method defined in claim 1 wherein said step (b) is performed by providing a balancing apparatus including a pair of supports that are adapted to rotate the article and the balance ring to determine any unbalance therein.

11. The method defined in claim 1 wherein said step (c) is performed by exposing the first portion of the balance ring to a source of energy.

12. The method defined in claim 11 wherein said step (c) is performed by directing a beam of radiant energy against the first a portion of the balance ring.

13. The method defined in claim 12 wherein said step (c) is performed by a laser.

14. The method defined in claim 11 wherein said step (c) is performed by exposing the first a portion of the balance ring to heat.

* * * * *